United States Patent [19]

Ichihara

[11] Patent Number: 4,701,880
[45] Date of Patent: Oct. 20, 1987

[54] OPTICAL SYSTEM FOR RECORDING/REPRODUCING INFORMATION BY MEANS OF A DIELECTRIC BREAKDOWN EFFECTED BY PHOTOSWITCHING OF A BIAS-VOLTAGE

[75] Inventor: Katsutarou Ichihara, Kawagoe, Japan

[73] Assignee: Kabushiki Kaisha Toshiba, Japan

[21] Appl. No.: 731,360

[22] Filed: May 7, 1985

[30] Foreign Application Priority Data

May 9, 1984 [JP] Japan .................. 59-92441

[51] Int. Cl.$^4$ .................. G11C 13/00; G11C 11/42; G11B 11/18
[52] U.S. Cl. .................. 365/106; 365/110
[58] Field of Search .................. 365/110–112, 365/127, 106, 120

[56] References Cited

U.S. PATENT DOCUMENTS

| | | | |
|---|---|---|---|
| 3,002,835 | 10/1961 | Kostelec | 365/110 X |
| 3,303,341 | 2/1967 | Fram | 365/110 X |
| 3,467,951 | 9/1969 | Wiese, Jr. | 365/110 |
| 3,573,753 | 4/1971 | Skelly | 365/110 X |
| 3,699,374 | 10/1972 | Scholl et al. | 365/110 X |
| 3,747,075 | 7/1973 | Keneman et al. | 365/112 |
| 3,906,462 | 9/1975 | Feinleib et al. | 340/173 |
| 4,035,774 | 7/1977 | Chang | 365/110 X |
| 4,159,443 | 6/1979 | Stocker et al. | 315/169.3 |
| 4,207,617 | 6/1980 | Yasuda et al. | 365/106 X |
| 4,509,145 | 4/1985 | Bosch et al. | 365/120 X |

FOREIGN PATENT DOCUMENTS

| | | |
|---|---|---|
| 48-30832 | 4/1973 | Japan . |
| 48-31967 | 4/1973 | Japan . |
| 53-70730 | 6/1978 | Japan . |
| 1602893 | 11/1981 | United Kingdom . |
| 2142494 | 1/1985 | United Kingdom . |

OTHER PUBLICATIONS

V. Marello et al., Applied Physics Letters, vol. 31, No. 7, Oct. 1977, The Memory Effect of ZnSiMn ac Thin Film Electroluminescence.

Primary Examiner—Stuart N. Hecker
Assistant Examiner—Alyssa H. Bowler
Attorney, Agent, or Firm—Schwartz, Jeffery, Schwaab Mack, Blumenthal & Evans

[57] ABSTRACT

An optical information recording/reproducing system comprises (A) a recording medium including a recording-bit producing layer, which is comprised of a fluorescent substance, and a photoconductive layer, both layers being interposed between conductive layers, at least one of which is transparent; (B) means for selectively applying a voltage to both sides of the recording medium; (C) means for radiating an optical recording beam to a site on the recording medium while applying a voltage to the recording medium and, then, applying a high electric field to the recording-bit producing layer by way of the photoconductive layer, the resistance of the recording-bit producing layer being lowered at the site, thereby developing a dielectric breakdown and, hence, causing the fluorescent substance to lose the fluorescence, so that information is recorded; and (D) means for radiating an optical reproducing beam on the recording medium without applying any voltage to the recording medium and, then, reproducing information depending on whether fluorescence has been produced. The system is characterized by an improved S/N ratio upon reproduction and an increment to the storage capacity.

22 Claims, 7 Drawing Figures

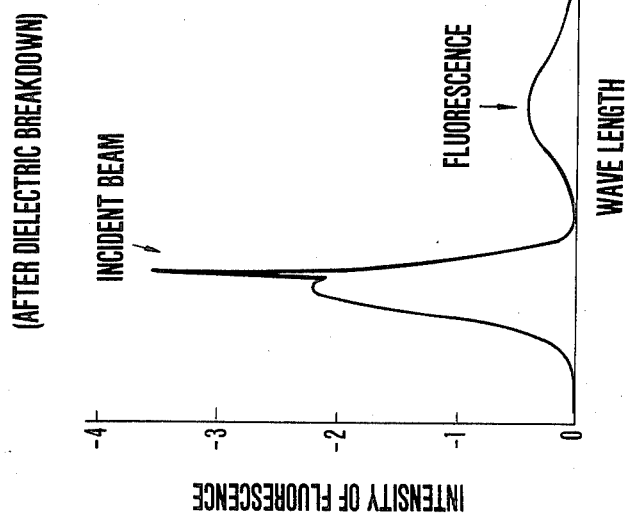
FIG. 1(b) (AFTER DIELECTRIC BREAKDOWN)
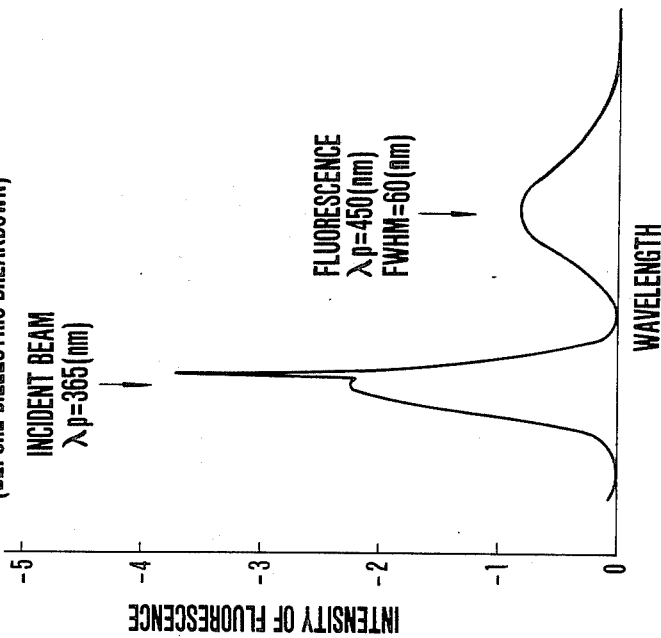
FIG. 1(a) (BEFORE DIELECTRIC BREAKDOWN)

OPTICAL SYSTEM FOR RECORDING/REPRODUCING INFORMATION BY MEANS OF A DIELECTRIC BREAKDOWN EFFECTED BY PHOTOSWITCHING OF A BIAS-VOLTAGE

BACKGROUND OF THE INVENTION

This invention relates to an optical information recording/reproducing system adapted to perform the recording/reproduction of information by radiating optical beams.

There have been known optical recording media each of which is adapted to perform the recording/reproduction of information by using a laser as a light source and radiating a light beam of 1 μm or so in diameter to the surface of the medium. These optical recording media permit higher recording densities compared with magnetic recording media and the like and are attracting attention as large-capacity memories. As optical recording media, Te-C, $TeO_x$ (x=1.1–1.2), Te-Se-Pb, Te-TiAgSe, etc. have already been developed and found utility in such fields as disk memories for documents. As the first problem common to all the optical recording media which have been developed to date, it may be mentioned that they depend on a recording/reproducing method in which upon recording, a high-energy laser beam is radiated to locally heat a medium so as to form a hole or to induce a phase transformation in its recording layer and upon reproduction, a low-energy laser beam is radiated to detect a difference in reflectivity between the site where the hole has been formed or the phase transformation has been induced (the recorded site) and another site where no hole has been formed or no phase transformation has been induced (a non-recorded site) [reference may be made to many publications, led by the Handout of 116th Study Meeting (May 26, 1983), 131th Thin Film Committee, the Japan Society for the Promotion of Science]. In the above recording/reproducing method, it is indispensable to control the energy of the laser beam, which is used upon reproduction, lower than the threshold for recording. Since the S/N ratio of a reproducing signal is a value proportional to the energy of the reproducing laser beam, there is an upper limitation to the value of the S/N ratio as far as the above recording/reproducing method is relied upon. Due to such an upper limitation, the S/N ratios of media which have been proposed to date are as low as about 55 dB or so. It is therefore extremely difficult to apply such prior art media to memory fields requiring high S/N ratios, such as analog image file memories and high-quality image memories unless their S/N ratios are improved. As the second problem common to the optical recording media which have been developed so far, it may be mentioned that each medium contains a single recording-bit producing layer and the storage capacity of the medium is governed by the spot diameters of the recording and reproducing beams on the surface of the medium, the width and pitch of optical head guiding grooves and the area of the medium. For example, when a semiconductor laser beam having a wavelength of 830 nm is used and a substrate equipped with optical head guiding grooves of 1 μm in width and 2 μm in pitch is employed, the storage capacity of a disk having a diameter of 30 cm is limited to about 2 gigabytes or so. It is therefore extremely difficult to use such a disk in a memory field requiring high storage capacity such as high accuracy and fineness image memories and animation memories, unless its storage capacity is improved.

As mentioned above, the conventional optical recording media are accompanied with such problems as insufficient S/N ratios and storage capacity upon expanding their application fields as memories.

SUMMARY OF THE INVENTION

With a view toward solving the above-mentioned problems, the present invention has as an object thereof the provision of an optical information recording/reproducing system which permits an improvement to the S/N ratio upon reproduction and an increment to the storage capacity owing to the adoption of a recording/reproduction method which is different in principle from the conventional recording/reproduction method.

The optical recording/reproducing system of this invention comprises: a recording medium composed of a recording-bit producing layer, which is formed of a fluorescent substance, and a photoconductive layer, both interposed between two conductive layers at least one of which is transparent; means for selectively applying a voltage to both sides of the recording medium; means for radiating an optical recording beam to a site to be recorded on the recording medium while applying a voltage to the recording medium and then, applying a high electric field to the recording-bit producing layer by way of the photoconductive layer the resistance of which has been lowered at the site, whereby developing a dielectric breakdown and hence causing the fluorescent substance to lose the fluorescence thereof so that information is recorded; and means for radiating an optical reproducing beam on the recording medium without applying any voltage to the recording medium and then, reproducing information depending on whether fluorescence has been produced.

BRIEF DESCRIPTION OF THE DRAWINGS

FIGS. 1(a) and 1(b) illustrate a change between the fluorescence spectrum intensity before the dielectric breakdown (recording) in this invention and that after the dielectric breakdown;

In FIGS. 2 and 3, there are shown substrates 1,11, fluorescent substance layers 2,$12_1$–$12_3$, photoconductive layers 3,$13_1$–$13_3$, transparent conductor layers 4,$14_1$–14, electrodes 5,$15_1$–$15_4$, bias power sources 6,16, terminals $17_P$,$17_N$ of power source, and switching box 18.

In FIG. 4 to FIG. 6, there are shown a recording laser beam 31, reproducing laser beam 519, focusing lenses 32,58, grooved substrate 33 for an optical transparent disk, transparent electrodes $34_1$,$34_2$, reflective electrode $34_3$, photoconductive layers $35_1, 35_2$, fluorescent substance layers $36_1, 36_2$, electrodes $37_1, 37_2$, photoconductive switches $38_1$–$38_4$, switching electrodes $39_1$–$39_8$, sheet-type battery 310, disk holder 311, rotator 312, pulse-trains $41_1$–$41_3$ of recording signals, laser drive sources $42_1$–$42_3$,52, semiconductor lasers $43_1$–$43_3$,53, lenses $44_1 44_3$,54, half-mirrors $45_1$–$45_3$,55, mirrors $46_1, 46_2$, λ/4 plates 47,57, cylindrical lens 48, focusing/tracking drive circuit 49, voice coils 410,518, continuously-oscillating reproducing signal 51, hemispherical lens 59, silicon brew cell 510, differential amplifier 511, dichroic mirrors 512,513, PIN-photo detectors 514,515, and pulse-trains 516,517 of reproducing outputs.

DESCRIPTION OF PREFERRED EMBODIMENTS

Figure 2:
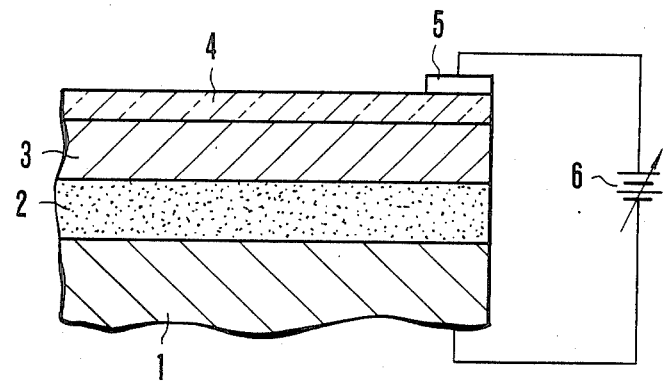
FIG. 2 illustrates the structure of an optical recording medium according to one embodiment of this invention.

The optical information recording/reproducing system of this invention is shown by way of example in FIG. 2, in which the photoconductive layer 3 may be made of any material so long as its resistivity is lowered by a recording beam to a certain predetermined extent or more to permit conduction of a current therethrough. A photoconductive layer the resistivity of which is $10^{14}$ (Ω·cm)–$10^9$ (Ω·cm) while unexposed to the recording beam and $10^8$ (Ω·cm)–$10^4$ (Ω·cm) upon exposure to the recording beam [$\rho_D = 10^{14}$ (Ω·cm)–$10^9$ (Ω·cm); $\rho_P = 10^8$ (Ω·cm)–$10^4$ (Ω·cm)] is desirable, although the resistivity ($\rho_D$) and ($\rho_P$) may vary depending on the wavelength of the radiation source. As specific examples of photoconductive materials usable for the photoconductive layer of the optical information recording/reproducing system of this invention, there are amorphous Si:H, amorphous Si-Ge:H, Se-base materials, and μC-Si (microcrystalline Si). Photoconductive materials having good photoconductive characteristics on the long wavelength side, such as amorphous Si-Ge:H are especially preferred.

The thickness of the above photoconductive layer is generally 200 Å–10,000 Å with 400 Å–2,000 Å being particularly preferred. If the thickness should be thinner than 200 Å, the intended effect, namely, changes of electrical resistivity upon exposure to beams will not be brought about sufficiently. Any thicknesses greater than 10,000 Å will result in excessively small transmittance for recording and reproducing beams.

The above-described photoconductive layer may be formed by processes known per se in the art. It is especially preferred to form it by the plasma CVD process (Plasma-assisted Chemical Vapor Deposition, in which a mixed gas of $SiH_4$, $GeH_4$ and $H_2$ is for example introduced at a substrate temperature of 200° C. or so and RF pulses are applied to generate plasma, whereby to coat a surface of a substrate with a gas decomposition product in the plasma.).

In FIG. 2, the fluorescent substance layer 2 forms a recording-bit producing layer. As the fluorescent substance usable to form the fluorescent substance layer 2, any fluorescent substance may be mentioned so long as it undergoes dielectric breakdown and loses its fluorescent characteristics when a voltage of a certain level or higher is applied. As specific examples of the fluorescent substance, may be mentioned Eu-activated $Y_2O_3$, Fe-activated $LiAlO_2$, Tb/Ce-activated $Y_2SiO_5$, Ag-activated ZnS, Cu-activated ZnS, Eu-activated $Y_2O_2S$, Er-activated $YF_3$, Ho-activated $YF_3$, Tm-activated $YF_3$, Er-activated $LaF_3$, Tm-activated $LaF_3$, Er-activated $Y_3OCl_7$, Ho-activated YOCl, Er-activated $Y_3OCl_7$, Ho-activated $Y_3OCl_7$, Er-activated $Y_2O_3$, Er-activated $Y_2O_2S$, Ce-activated $Y_2SiO_5$, Eu-activated $YVO_4$ and Tb-activated $Y_2SiO_5$.

An infrared-to-visible conversion fluorescent substance led by Er-activated $YF_3$, Tm-activated $YF_3$, Er-activated $Y_2O_3$ or the like is particularly preferred. If such a infrared-to-visible conversion fluorescent substance is used as the fluorescent substance for the recording-bit producing layer, it is possible to use as a recording/reproducing light source a semiconductor laser which has already been developed and oscillates at a wavelength of 780 nm in infrared region. This is particularly advantageous from the viewpoint of systems.

The recording-bit producing layer, namely, the fluorescent substance layer may have any thickness so long as it ranges from 250 Å to 10,000 Å. However, it may generally be 400 Å–5,000 Å with 500 Å–1,000 Å being especially preferred. If the thickness of the recording-bit producing layer should exceed 10,000 Å, the transmittance of the recording and reproducing beams will be impaired. On the other hand, any thicknesses smaller than 250 Å will not be able to draw out its intended effects to any significant extent, in other words, will not be able to provide sufficient fluorescence when the fluorescent substance is exposed to the reproducing beam.

The resistivity of the recording-bit producing layer may generally be $10^{16}$ Ω·cm–$10^7$ Ω·cm. It is particularly preferred that the resistivity of the recording-bit producing layer is $10^{14}$ Ω·cm–$10^9$ Ω·cm, namely, is coincided with the resistivity of the photoconductive layer upon exposure to beams.

The above recording-bit producing layer may be formed on the substrate 1 by the conventional sputtering process, vacuum deposition process or the like (as specific example, may be mentioned to sputter a sintered target made of a fluorescent substance with Ar ions so as to form a thin fluorescent film on the substrate; or to place a fluorescent substance in a crucible and cause the fluorescent substance to deposit in vacuum on a substrate by the use of electron beam). The lamination sequence of the photoconductive layer and recording-bit producing layer on the substrate may be effected by laminating the photoconductive layer on the recording-bit forming layer (fluorescent substance layer) as shown in FIG. 2, or vice versa.

The transparent conductor layer designated at numeral 4 in FIG. 2 may be made of any substance so long as it is a transparent conductive substance capable of allowing the transmission of the recording and reproducing beams and fluorescence from the fluorescent substance layer. Usually, tin oxide, ITO (Indium Tin Oxide) and extremely-thin films of metals (films made each of Ti, Cr, Ni or the like and having a thickness of 50 Å or less). ITO or the like is especially preferred, because its conductivity and optical transmittance are both superb.

The thickness of the conductor layer may be of any value so long as it does not impair the transmittance of the recording and reproducing beams and fluorescence from the fluorescent substance layer as well as the conductivity of the conductor. Although the thickness may vary depending on its material, it is generally 50 Å–2,000 Å with 100 Å–500 Å being preferred.

The transparent conductor layer may be formed by usual vacuum deposition or the like.

Figure 3:
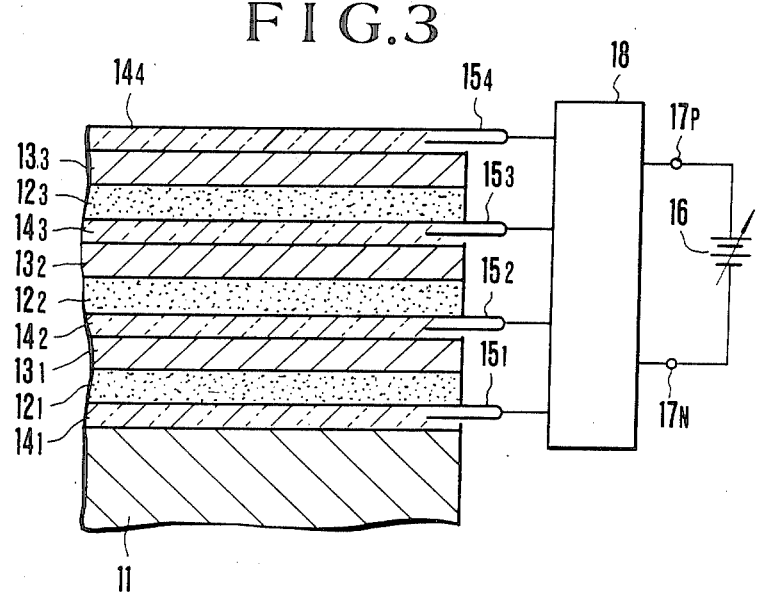
FIG. 3 shows the structure of an optical recording medium according to another embodiment of this invention.

As illustrated by way of example in FIGS. 2 and 3, the voltage application means of this invention is composed of the electrodes 5,$15_1$–$15_4$, the bias power sources 6,16, terminals $17_P, 17_N$ of the power source 16, the switching box 18 and the like. The voltage varies depending on the types and thicknesses of fluorescent substance layer and photoconductive layer to be used. Generally, about 1–2 volt is sufficient. The power consumption level and time required for the production of recording bits all over the disk may respectively be around 0.3 mW and 3 hours where the storage capacity of the disk is $10^{10}$ bits/disk and the recording is effected at 1 MHz. Therefore, such recording can be carried out by incorporating a sheet-type battery, which is currently available on the market, in a disk. It is also practical, for example, to bury a tape-like photoconductive substance in a toroidal shape, which is concentric to the disk, within a vacant area (i.e., an area other than the recording area) of the inner circular part of the disk, to connect one of the electrodes of the tape-like photoconductive material to the electrode 5 or $15_1$–$15_4$ in FIGS. 2 or 3 and the other electrode to the sheet-like battery, and to optically drive the resultant switching box 18 made of the tape-like photoconductive substance by means of an optical switching head which is different from the recording and reproducing laser heads, because this arrangement makes it unnecessary to provide a separate switching box outside the disk.

The wavelengths of the recording beam and reproducing beam, which are both used in the present invention, may be the same or different. It is however necessary for the recording and reproducing beams to pass through a multi-layered recording cell. Hence, their wavelengths may preferably range from 350 nm to 1,200 nm with 780 nm–850 nm being particularly preferred. However, it may not be able to impart switching characteristics to the photoconductive layer to reduce the resistance of the photoconductive layer and hence to allow the photoconductive layer to function as intended, unless an exposing beam having a wavelength of 1,200 nm or shorter (which may vary depending on the type of the photoconductive layer) is applied, for example, even when a-SiGe:H, which is considered to have the best sensitivity to infrared ray these days, is used. On the other hand, use of wavelengths shorter than 350 nm are not preferred because they result in extremely low transmittance, for example, through a-SiGe:H photoconductive layers. The above wavelength range may automatically be expanded provided that photoconductive materials capable of exhibiting photoconductivity to wavelengths longer than 1,200 nm and or those having high beam transmittance to wavelengths shorter than 350 nm are developed in the future. Therefore, the specific fluorescent substances given above by way of example include those capable of emitting fluorescence by 254 nm excitation and employed currently for illumination purposes. Specifically, Ar-ion laser, He-Ne laser, dye lasers, YAG lasers and semiconductor lasers may be mentioned. Since a semiconductor laser having a wavelength of 780–850 nm and an output of about 10 mW is particularly advantageous for the size and weight reduction of the memory system, such a semiconductor laser can be used favorably in the present invention.

In another preferred embodiment of this invention, the optical information recording/reproducing system of this invention makes use of a recording medium of the above-described basic structure as a single recording cell and is composed by laminating a plurality of recording media of different fluorescence spectra.

The principle of recording and reproduction in the optical recording/reproducing system of this invention will hereinafter be described briefly.

Namely, when a voltage $V_{ex}$ is impressed between the two conductor layers in the above basic structure, an electric field, $V_{ex} \cdot \rho_F/(\rho_F t_F + \rho_D t_P)$ is induced in the recording-bit producing layer. Here, $\rho_F$ is the resistivity of the recording-bit producing layer, $t_F$ the thickness of the recording-bit producing layer, $\rho_D$ the resistivity of the photoconductive layer while not exposed to the recording optical beam, and $t_P$ the thickness of the photoconductive layer. When the recording laser beam is radiated to a site to be recorded in the above state, the resistance of the photoconductive layer is lowered at the radiated site and the intensity of the electric field in the recording-bit producing layer is increased at the radiated site to $V_{ex} \cdot \rho_F/(\rho_F t_F + \rho_P t_P)$, where $\rho_P$ is the resistivity of the photoconductive layer during exposure to the recording optical beam. Namely, when the recording optical beam is radiated while impressing $V_{ex}$ under the following conditions:

$$V_{ex} \cdot \rho_F/(\rho_F t_F + \rho_D t_P) < E_B$$

$$V_{ex} \cdot \rho_F/(\rho_F t_F + \rho_P t_P) > E_B$$

where $E_B$ means the intensity of the dielectric breakdown electric field of the fluorescent substance which makes up the recording-bit producing layer, the fluorescent substance undergoes dielectric breakdown at the radiated site and loses its fluorescence there. Representing the fluorescence-lost state and the fluorescence-retaining state of the fluorescent substance by "1" and "0" respectively, binary-coded recording can be achieved in the above-described manner. Upon reproduction of such binary signals, a reproducing optical beam is radiated without impressing any voltage between the two conductor layers. When the reproducing optical beam is radiated to the fluorescent substance which is in the state of "1", no fluorescence is given off from the fluorescent substance. When the reproducing optical beam is however radiated to the fluorescent substance which is in the state of "0", fluorescence is emitted. In other words, the binary signals "0" and "1" can be discriminated depending on whether fluorescence is "present" or "absent", if fluorescent spectra are detected in an optical reproduction system.

This invention allows to increase the radiation power of the reproducing optical beam to the recording medium as much as desired. As the power increases, the intensity of a fluorescent spectrum given off from a fluorescent substance in the "0" state becomes greater in proportion, whereby permitting reproduction of a signal having a large S/N ratio.

If, using the above-described basic structure as a single recording cell of a recording medium, a plurality of recording cells of the above type are laminated and the fluorescent spectrum of the fluorescent substance, which makes up a recording-bit producing layer, is rendered different from one cell to another, fluorescence having different spectra are emitted from respective cells upon exposure to a single reproducing optical beam. If these fluorescent spectra are isolated and detected in an optical reproducing system, the storage capacity can be increased in proportion to the number of cells and a far higher recording density can thus be attained even when the area of one recording bit is equal. When cells are laminated, signals (fluorescent spectra) from adjacent bits cause errors. This problem can however be solved completely if in an optical recording medium, the total thickness of the entire cells is designed to be smaller than the depth of focus of the recording/reproducing optical beam.

The operation of the optical information recording/reproducing system of this invention will next be described briefly.

The basic operation of the optical information recording/reproducing system of this invention may be achieved simply by adding a wavelength-discriminating function to the optical reproducing system of a DRAW-type (Direct Read After Write Type) optical disk system which is currently under use. When an a-Si-Ge:H film capable of developing photoconductivity at a wavelength of 830 nm and the above-mentioned infrared-to-visible conversion fluorescent substance are used respectively as the photoconductive layer and fluorescent substance layer for example, a currently-employed semiconductor laser may be used as the recording and reproducing light source. Thus, the optical recording system may have the same structure as that used currently, which is equipped with a focusing servomotor and a tracking servomotor. When a multi-layered recording medium is however used as shown in FIG. 3, the NA of the focusing lens and the focusing mechanism should be adjusted so as to make the focal depth of the recording and reproducing laser beam longer than the total thickness of the layers of the medium. In the system of this invention, signals from the medium can be detected whether transmitted light or reflected light is used. When transmitted light is used, attention should be paid to possible development of errors due to dust on the surfaces of the medium. When reflected light is used, it may be desirable to provide a reflecting film which may be made of Al, Ag, Au, Cu or the like. Provision of such a reflecting film requires each signal to pass twice, namely, both medium itself and reflecting film. Taking the eminent attenuation of the signal in the course of its travel through the medium, the thickness of each layer of the medium and the sensitivity of the signal detector should be adjusted. Since signal component from the medium contains light of different wavelengths corresponding to the number of the fluorescent substance layers (although a single fluorescent substance layer is of course acceptable), the detection system is required to have wavelength-discriminating capacity. For example, it may be suitable to use a multi-wavelength spectrophotometer which is able to scan the wavelengths instantaneously so that the individual wavelengths, which are contained in the signal, can be analyzed. The above description pertains to the reproducing operation. The recording operation may for example be carried out in the following manner. If the above-described bias circuit and switching circuit, both built in the disk, are used, the production of bits corresponding to recording signals can be independently effected in each fluorescent substance layer by synchronously driving the recording laser and the light source for the switching circuit according to recording drive signals. Namely, the same optical recording system as that used currently can also be used as mentioned above. It is appropriate to add a light source for the switching circuit to the conventional optical recording system.

In the above-described reproduction, a spectrophotometer is employed for the detection of signals. When designing a disk system actually, use of a dichroic mirror or the like in the detection system permits easy separation of fluorescent spectra from respective fluorescent substance layers. This enables to use, as the structures of the other systems, the same structures as optical disk memories which are actually used these days.

This invention will be described in greater detail by the following Example.

EXAMPLE

First of all, the following basic experiment was conducted to confirm the propriety of the recording and reproducing principle of the optical information recording/reproducing system of this invention. A sample formed of a glass substrate, on which an ITO film had been formed, of 50×50 mm square and 1.5 mm thick and an Ag-activated ZnS fluorescent substance (excitation wavelength: 365 nm; fluorescence: 450 nm) coated to a thickness of 10 μm was prepared by mixing powder of the Ag-activated ZnS fluorescent substance in a butyl acetate solution, dipping the substrate in the resultant coating formulation, pulling the thus-coated substrate out of the formulation and then drying the same. Although the thickness of 10 μm is not preferred for actual applications, the simple coating method was followed because the experiment was intended to confirm the principle. The sample was exposed to ultraviolet ray of 365 nm, and the light which was allowed to transmit through the sample was spectroscopically analyzed by means of a spectrophotometer (Model: SS-25C; manufactured by Nippon Bunko K. K.). Then, a glass plate bearing an ITO film thereon is pressed against the surface of the fluorescent substance layer of the sample. Electrodes were extended out respectively from the two ITO films between which the fluorescent substance was interposed, and a voltage was applied between the electrodes while increasing its level little by little. Since the fluorescent substance layer was obtained by the dip-coating method, it was electrically leaky and it was hence not possible to determine its breakdown voltage specifically. Localized arcs occurred at application voltages of about 100 V. Although it was not possible to subject the entire surface of the fluorescent substance layer to uniform electric breakdown due to its leaky nature, the sample was spectroscopically analyzed, after its breakdown, by the same means as that employed for the spectroscopic analysis of the same sample before its breakdown.

Spectrum distributions obtained respectively before and after the dielectric breakdown in the above experiment are shown in FIGS. 1(a) and 1(b) respectively. In both FIGS. 1(a) and 1(b), an ordinate axis is illustrated in the same scale with each other. In FIG. 1(a), a distribution having peaks respectively at 365 nm of the incident light and 450 nm of the fluorescence from the sample is shown. In FIG. 1(b), the intensity of fluorescence is as low as about one half of the intensity of fluorescence before the breakdown although no difference is observed between the intensity of the incident light after the breakdown and that before the breakdown.

From the above results, the attenuation was calculated to be about 58% for the layer thickness of 10 μm. It has been proven that the fluorescent characteristics of a fluorescent substance are either reduced to certain extents or lost completely upon its electric breakdown and the transmittance after the breakdown remains at the same level as that before the break down in the wavelength ranges other than fluorescent wavelengths. The above experiment has thus successfully corroborated the the principle of the recording in this invention that fluorescent substance is subjected to dielectric breakdown to cause the fluorescent substance to lose its fluorescent characteristics.

The structure of an optical recording medium according to one embodiment of this invention is then illustrated in FIG. 2. In FIG. 2, there are shown a sample Al substrate 1 (20 mm square and 2 mm thick), an Er-activated YF$_3$ fluorescent substance layer 2 (layer thickness: 1000 Å) formed by the sputtering technique, an amorphous Si photoconductive layer 3 (layer thickness: 1000 Å) formed by the plasma CVD technique, a transparent conductor layer 4 formed by the vacuum deposition technique, such as ITO, an indium electrode 5, and a bias power source 6. In the above-structured sample, the voltage $V_{ex}$ of the power source 6 was set at 0 (V) and the transparent conductor layer 4 was scanned by a semiconductor laser beam of 780 nm to expose the layer 4 to the laser beam. Then, fluorescence of a green color (central wavelength: 550 nm; FWHM: about 50 nm) was emitted from the fluorescent substance layer 2 to all over the sample. Thereafter, a central site of the sample was continuously radiated at a radiation power of 10 mW with a laser beam. When the voltage $V_{ex}$ of the power source 6 was increased little by little while monitoring fluorescence from the radiated site by means of a spectrophotometer, fluorescence was no longer detected at $V_{ex} \leq 1$ (V). Then, $V_{ex}$ was returned to 0 (V), and while scanning and radiating the entire surface of the sample again with the laser beam, fluorescence from the radiated sites were monitored. No fluorescence was detected from the central site (the site radiated with the laser when $V_{ex}$ was increased as described above) of the sample, whereas fluorescence was detected from the unradiated sites. A recording bit is thus produced in the central site of the sample by radiating a laser beam and applying a voltage in the manner mentioned above, because the photoconductive layer 3 is in a low-resistance, i.e., conductive state at the laser-radiated site but in an insulating state at the sites not radiated with the laser and the applied voltage $V_{ex}$ is transmitted in its entirety to the fluorescent substance layer 2 in the laser-radiated site, but is divided to the photoconductive layer 3 and fluorescent substance layer 2 in the sites not radiated with the laser. Namely, when the applied voltage $V_{ex}$ has reached 1 V, the product of the dielectric breakdown intensity (=100 KV/cm) and the layer thickness (1000 Å) of the fluorescent substance layer 2, an electric field of 100 KV/cm is applied to the laser-radiated site of the fluorescent substance layer 2 and dielectric breakdown is induced whereby to lose characteristics as a fluorescent substance. On the other hand, the intensity of an electric field applied to the sites of the fluorescent substance layer 2 which sites are not radiated by the laser is kept lower than 100 KV/cm. Thus, no breakdown occurs there. When reproducing the recording bits, the output of the reproducing laser can be increased as much as desired if the voltage $V_{ex}$ is kept at 0 (V). When fluorescence was detected by radiating a laser beam at 10 mW, which was the same level as the laser beam employed upon recording, to the test sample of FIG. 1, the contrast ratio of the fluorescence intensity of the recorded site (which did not give off fluorescence) to that of the non-recorded sites (which emitted fluorescence) was significantly large.

The structure of an optical recording medium according to another embodiment of this invention is also shown in FIG. 3. In FIG. 3, there are illustrated a sample glass substrate 11 (20 mm square; 1.5 mm thick), fluorescent substance layers $12_1, 12_2, 12_3$ (each, 500 Å thick) formed by the sputtering technique, the layers $12_1, 12_2, 12_3$ being respectively made of Er-activated Y$_2$O$_3$, Tm-activated YF$_3$ and Er-activated YF$_3$, amorphous Si photoconductive layers $13_1, 13_2, 13_3$ (each, 500 Å thick) formed by the plasma CVD technique, transparent conductor layers $14_1$–$14_4$ (each, 300 Å thick) such as ITO formed by the vacuum deposition technique, indium electrodes $15_1$–$15_4$, bias power source 16, positive terminal $17_P$ of the bias power source, negative terminal $17_N$ of the bias power source, and switching box 18.

In the sample of the above structure, the voltage of the bias power source 16 was first of all fixed at 0.6 V and the switching box 18 was operated so as to disconnect the electrodes $15_1$–$15_4$ and the terminals $17_P, 17_N$ of the bias power source from each other. Then, a semiconductor laser beam of 780 nm was radiated from the side of the glass substrate 11. Fluorescent spectra given off from the radiated sites were measured by means of a spectrophotometer. The measurement detected a fluorescent spectrum (central wavelength: 550 nm; half-power width: 50 nm) from the layer $12_3$ of the Er-activated YF$_3$, a fluorescent spectrum (cental wavelength: 450 nm; half-power width: 50 nm) from the layer $12_2$ of the Tm-activated YF$_3$ fluorescent substance and a fluorescent spectrum (cental wavelength: 650 nm; half-power width: 50 nm) from the layer $12_1$ of the Er-activated Y$_2$O$_3$ fluorescent substance. Thereafter, the switching box 18 was operated to connect the electrode $15_4$ and terminal $17_P$ as well as the electrode $15_3$ and terminal $17_N$ respectively, and a laser beam was radiated at a power of 10 mW from the side of the substrate 11. Fluorescent spectra emitted from the radiated site were measured. It was only the fluorescent spectrum from the layer $12_3$ of the Er-activated YF$_3$ that became no longer detectable. This can be attributed to the following fact. As mentioned above in connection with the first embodiment, the photoconductive layer $13_3$ was rendered conductive upon irradiation with the laser beam when the bias voltage of 0.6 V was applied between the electrodes $15_4$ and $15_3$. Reflecting this change, an electric field in excess of the intensity of withstandable dielectric breakdown electric field of the fluorescent substance layer $12_3$ was thus applied to the fluorescent substance layer $12_3$ and the fluorescent substance layer $12_3$ lost its characteristics as as fluorescent substance. A similar experiment was also conducted by operating the switching box 18 in such as way that connection between the electrodes $15_1$–$15_4$ and the terminals $17_P, 17_N$ was switched over. It was possible to make the layer $12_2$ of the Tm-activated YF$_3$ fluorescent substance and the layer $12_1$ of the Er-activated Y$_2$O$_3$ fluorescent substance loose their characteristics as fluorescent substances independently. By the way, each fluorescent substance layer which had undergone dielectric breakdown (i.e., each recorded fluorescent substance layer) lost only its characteristics as a fluorescent substance and remained transparent to the semiconductor laser beam of 780 nm and fluorescence emitted from different fluorescent substances layers (non-recorded layers). For example, the layer $12_2$ of the Tm-activated YF$_3$ fluorescent substance was solely recorded in the structure of FIG. 3 and fluorescent spectra emitted from the recorded site were measured from the outside. The fluorescence from the layer $12_3$ of the Er-activated YF$_3$ and that from the layer $12_1$ of the Er-activated Y$_2$O$_3$ were both detected with significant intensity levels.

Comparing the recording density of the recording medium having the structure of FIG. 2 with that of the recording medium having the structure of FIG. 3 under the same laser spot diameter and the same bit interval, it is readily envisaged that the recording density (number of recording bits per unit area of the sample) of the medium having the structure of FIG. 3 is three times that of the structure shown in FIG. 2. Even in this laminated structure, it is still possible to avoid unintensional detection of signals (fluorescence) from adjacent bits by making the depth of focus of the laser beam longer than the total thickness of the medium.

As has been described above, the present invention can obtain record signals having a significantly large contrast ratio relative to signals available from non-recorded sites by making the "presence" and "absence" of fluorescence from a recording-bit producing layer, which is composed of a fluorescent substance, correspond respectively to the binary signals "1" and "0". By laminating fluorescent substances having different fluorescent spectra, it is also possible to obtain a recording density higher than that available from a single-layered recording medium even if the spot diameter of the recording/reproducing optical beam is the same.

Based on the finding obtained by the above-described basic experiment, the optical information recording/reproducing system according to the one embodiment of this invention was operated specifically.

Figure 4:
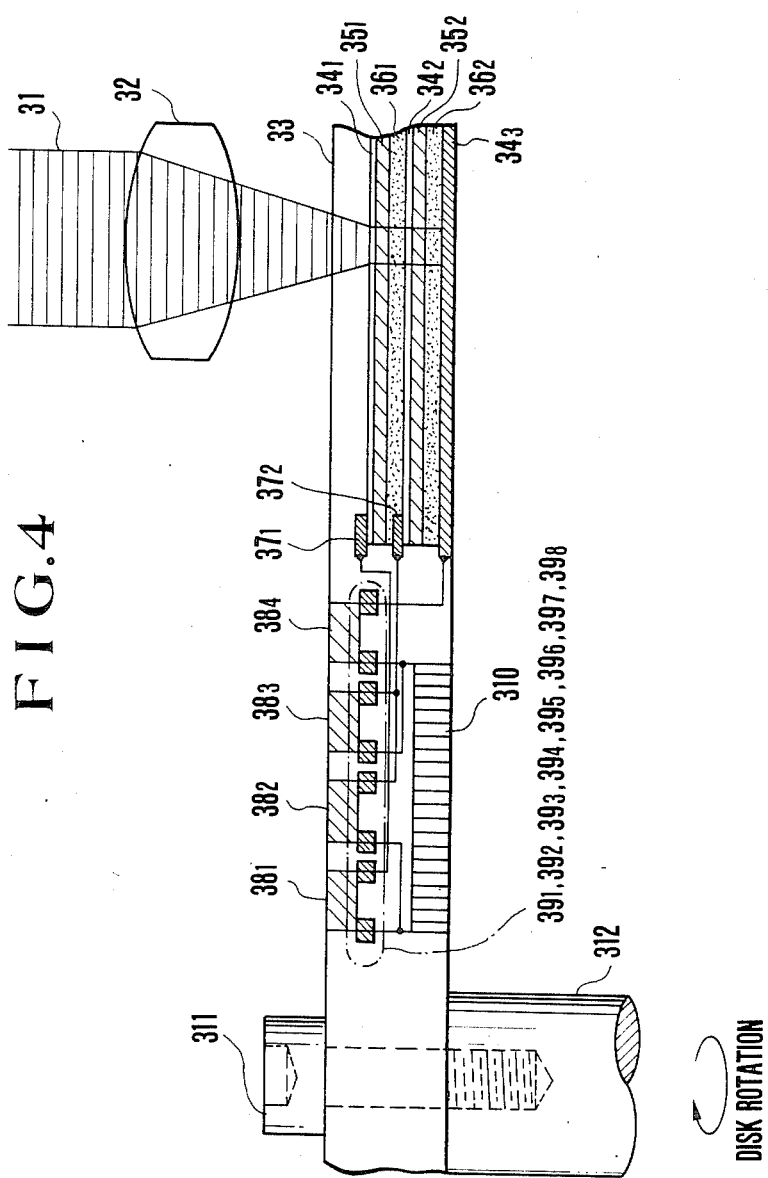
FIG. 4 is a cross-sectional view of a disk in an optical information recording/reproducing system according to one embodiment of this invention.

FIG. 4 is a cross-sectional structural view of one example of optical disks employed in the operation of the optical information recording/reproducing system of the one embodiment of this invention. In FIG. 4, there are illustrated a recording pulsated laser beam 31 ($\lambda=780$ nm; power: 5 mW), focusing lens 32, transparent substrate 33 defining a guide groove for its associated optical head, said substrate 33 having an outer diameter of 300 mm and thickness of 1.5 mm and containing a recording medium in its area extending from a disk radius of 40 mm to another disk radius of 140 mm, ITO films $34_1,34_2$, each 200 Å thick, a-Si-Ge:H photoconductive films $35_1,35_2$, each 1,000 A thick, Tm-activated YF$_3$ (central fluorescent wavelength: 450 nm) and Er-activated Y$_2$O$_3$ (central fluorescent wavelength: 650 nm) fluorescent substance layers $36_1,36_2$, each 1,000 Å reflective Al layer $34_3$ serving also as an electrode, Al electrodes $37_1,37_2$, switching alley $38_1$–$38_4$, each formed of an a-Si-Ge:H photoconductive film, Al switching electrode alley $39_1$–$39_8$, sheet-type Li battery 310 (output voltage: 0.7 V), disk center holder 311, and disk rotator 312. Here, the Al electrodes 37, switching alley 38 and switching electrode alley 39 are formed as films on paths concentric to the disk 33.

Figure 5:
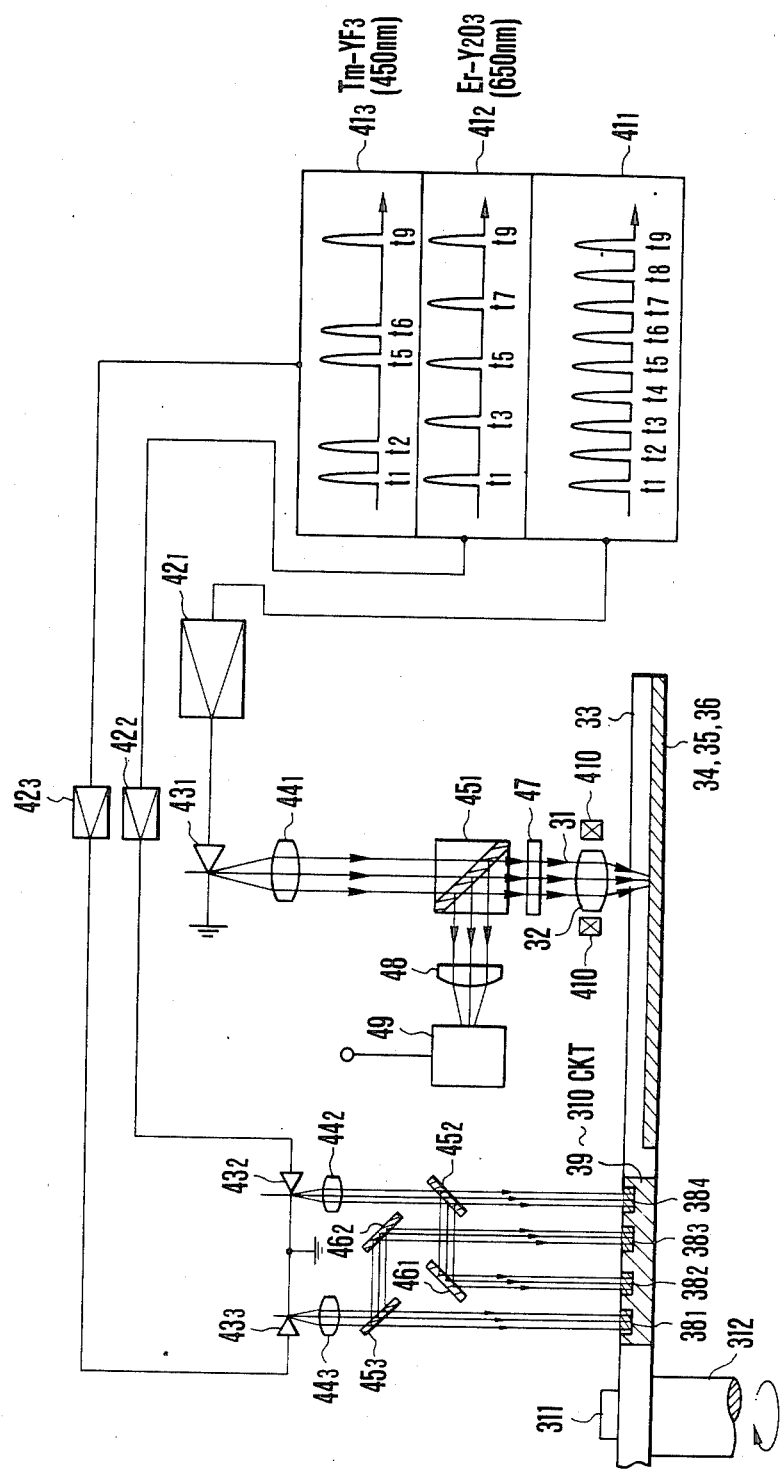
FIG. 5 is a simplified block diagram of one example of the recording system in the optical information recording/reproducing system.

FIG. 5 is a simplified block diagram of the recording system according to one embodiment of this invention. In FIG. 5, there are depicted a signal pulse train $41_1$ irradiated to the recording medium (recording-bit producing area); signal pulse train $41_2$ irradiated to the photoconductive switches $38_2,38_4$ in the switching alley so that recording bits are produced only in the Er-activated Y$_2$O$_3$ fluorescent substance layer $36_2$ in the recording medium; signal pulse train $41_3$ irradiated to the photoconductive switches $38_1,38_3$ in the switching alley so that recording bits are produced only in the Tm-activated YF$_3$ fluorescent substance layer; laser drive sources $42_1$–$42_3$ driven by their corresponding signal pulse trains; semiconductor lasers $43_1$–$43_3$ ($\lambda=780$ nm); lenses $44_1$–$44_3$ for making beams, which have been output from their respective lasers, parallel; half-mirrors $45_1$–$45_3$; mirrors $46_1,46_2$; $\lambda/4$ plate 47 for preventing once-output beams from travelling backward to their respective lasers; cylindrical focusing lens 48; focusing/tracking drive circuit 49; and voice coil 410 operated by the focusing/tracking drive circuit 49.

By loading the optical disk of FIG. 4 in the system of FIG. 5, a recording operation was conducted over the entire surface of the disk in the following manner. The signal train $41_1$ is a train of signal pulses having a half power width of 500 nsec and frequency of 500 KHz. In synchronization with the signal train $41_1$, the signal pulse trains $41_2,41_3$ which serve to drive the switching circuits were operated in accordance with their respective time schedules indicated in their corresponding pulse trains $41_1$–$41_3$. Namely, trains of bits are produced in the following sequence in the recording medium, i.e., in both Tm-activated YF$_3$ and Er-activated Y$_2$O$_3$ by the pulse corresponding to the time $t_1$, in only the Tm-activated YF$_3$ by the pulse corresponding to the time $t_2$, in only the Er-activated Y$_2$O$_3$ by the pulse corresponding to the time $t_3$, in neither the Tm-activated YF$_3$ nor the Er-activated Y$_2$O$_3$ by the pulse corresponding to the time $t_4$, in both Tm-activated YF$_3$ and Er-activated Y$_2$O$_3$ by the pulse corresponding to the time $t_5$, and the above sequence is then repeated. Setting the disk revolution number at 4 m/sec (constant linear velocity), the trains of signals were recorded in the area of from the radius of 40 mm to the radius of 140 mm, which was its recording area so that a train of about 5 Gbits of recording bits was produced (groove pitch: 3 $\mu$m). This recording capacity was about twice that of a single-layered optical disk memory obtained in accordance with the conventional technique.

Figure 6:
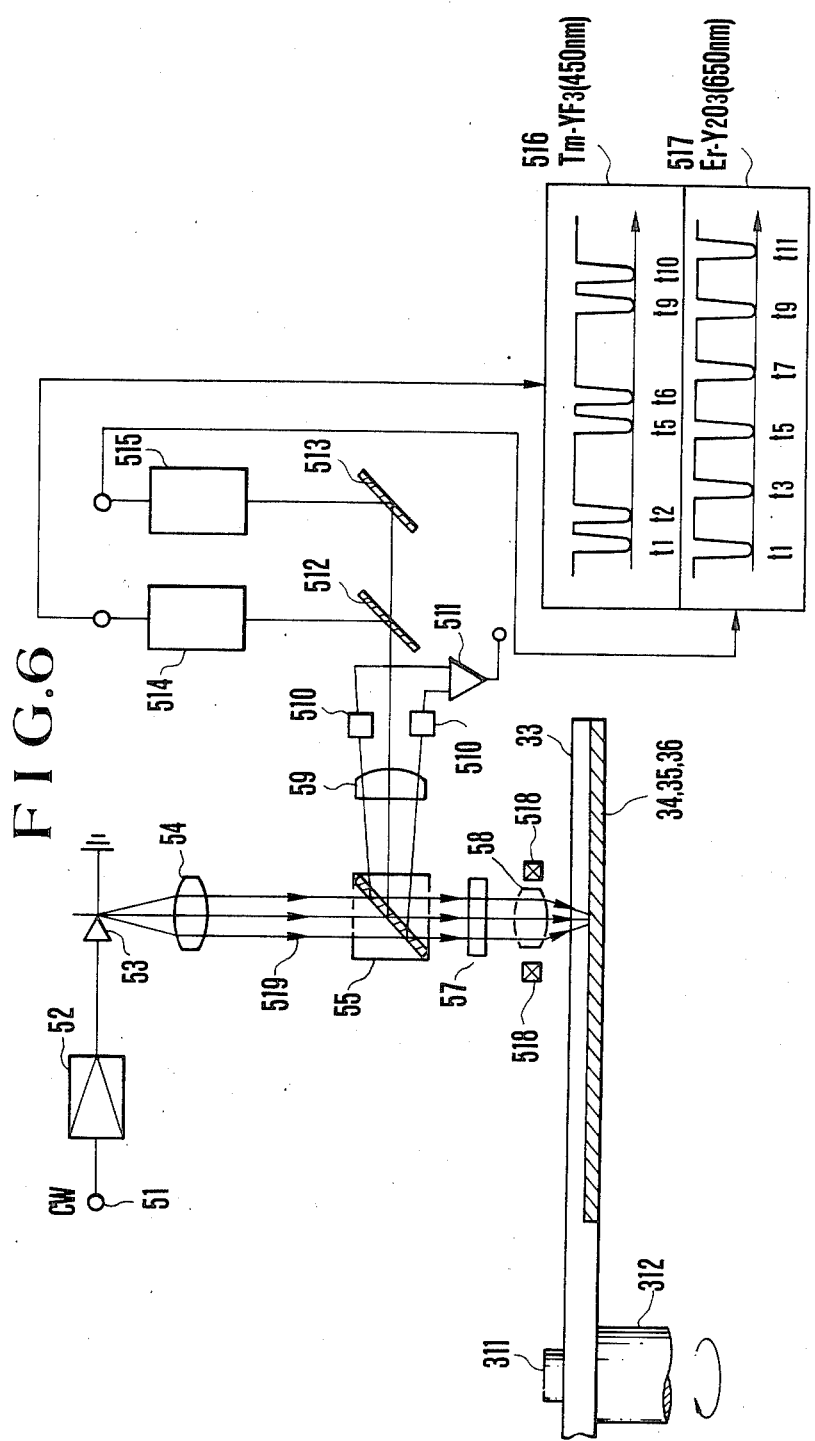
FIG. 6 is a simplified block diagram of one example of the reproducing system in the optical information recording/reproducing system.

The optical disk with the train of recording bits produced therein was then subjected to a reproducing operation, using the optical reproducing system shown in FIG. 6. In FIG. 6, there are shown the continuously-oscillating (DC) signal 51; reproducing laser drive source 52; reproducing semiconductor laser 53 ($\lambda=833$ nm); lens 54; half-mirror 55; $\lambda/4$ plate 57; focusing lens 58; hemispherical lens 59; reproducing laser beam 519; silicon brew cells 510; a differential amplifier 511 receiving each output of the silicon brew cell 510 as an input thereto and serving as a tracking signal generating circuit; voice coil 518 driven by differential amplifier 511; dichroic mirror 512 of the blue-reflection/green and red-transmission type; dichroic mirror 513 of the red-reflection type; blue-detection photodiode 514; red-detection photodiode 515; train of output pulses 516 reproduced from the Tm-activated YF$_3$ fluorescent layer; train of output pulses 517 reproduced from the Er-activated Y$_2$O$_3$ fluorescent layer.

As apparent from the trains of output pulses 516,517, reproduced bit trains corresponding to the recorded bit trains were detected. The pulses 516 and the pulses 517 were successfully discriminated from each other even when they were recorded at the same time, for example, at $t_1$. Thus, it has been confirmed through the operation of the system that the recording capacity increases as the number of fluorescent substance layers increases (two layers in the illustrated embodiment). In the above Example, the recording and reproducing operations were conducted at such a low frequency of 500 KHz in view of the responsibility of the fluorescent substances.

It is however possible to effect reproduction at higher frequencies and hence to use the system as a high-speed memory if the reproducing head is divided. In the above Example, the power of the reproducing laser beam was set at 3 mW. Even with such a small power, the intensity of each signal which had passed through the multi-layered medium was so high that the usual detection sensitivity was still sufficient for its detection. The power of the reproducing laser was increased up to 15 mW. The signal intensity increased almost linearly as the power of the reproducing laser increased. It has also been confirmed from the operation of the system that since the laser power at reproduction is 5 mW, high-power reproduction is feasible irrespective to the recording threshold power unless the switching circuits $38_1$–$38_4$ are operated at reproduction. The system of this invention has thus been found to be a disk memory system which has a high C/N ratio and unlike conventional systems, does not require to pay attention to the recording margin and reproducing margin upon its operation.

I claim:

1. An optical information recording/reproducing system comprising
   (A) a recording medium comprised of (i) a recording-bit producing layer that comprises a fluorescent substance, (ii) a photoconductive layer and (iii) conductive layers between which layers (i) and (ii) are interposed, respectively, at least one of the conductive layers being transparent;
   (B) means for selectively applying a voltage to both sides of the recording medium;
   (C) means for radiating an optical recording beam to a site on the recording medium while applying a voltage to the recording medium and, then, applying a high electric field to the recording-bit producing layer by way of the photoconductive layer, the resistance of the recording-bit producing layer being lowered at the site, such that a dielectric breakdown is developed and the fluorescent substance loses fluorescence, whereby information is recorded in said recording-bit producing layer; and
   (D) means for radiating an optical reproducing beam on the recording medium without applying any voltage to the recording medium and, then, reproducing information when fluorescence is produced by the fluorescent material, wherein said dielectric breakdown is effected by the photoswitching of a bias-voltage in the system.

2. The optical information recording/reproducing system as claimed in claim 1, wherein the photoconductive layer is comprised of a material selected from the group consisting of amorphous Si-Ge:H, $\mu$C-Si, Se-base materials and amorphous Si:H.

3. The optical information recording/reproducing system as claimed in claim 2, wherein the photoconductive layer is comprised of amorphous Si-Ge:H.

4. The optical information recording/reproducing system as claimed in claim 1, wherein the thickness of the photoconductive layer is 200 Å–10,000 Å.

5. The optical information recording/reproducing system as claimed in claim 4, wherein the thickness of the photoconductive layer is 400 Å–2,000 Å.

6. The optical information recording/reproducing system as claimed in claim 1, wherein the resistivity of the photoconductive layer is $10^{14}$ Ω·cm–$10^9$ Ω·cm while unexposed to the optical recording or reproducing beam and $10^8$ Ω·cm–$10^4$ Ω·cm upon exposure to the optical recording or reproducing beam.

7. The optical information recording/reproducing system as claimed in claim 1, wherein the fluorescent substance of the recording-bit producing layer is selected from the group consisting of Eu-activated $Y_2O_3$, Fe-activated $LiAlO_2$, Tb/Ce-activated $Y_2SiO_5$, Ag-activated ZnS, Cu-activated ZnS, Eu-activated $Y_2O_2S$, Er-activated $YF_3$, Ho-activated $YF_3$, Tm-activated $YF_3$, Er-activated $LaF_3$, Tm-activated $LaF_3$, Er-activated YOCl, Ho-activated YOCl, Er-activated $Y_3OCl_7$, Ho-activated $Y_3OCl_7$, Er-activated $Y_2O_3$, Er-activated $Y_2O_2S$, Ce-activated $Y_2SiO_5$, Eu-activated $YVO_4$ and Tb-activated $Y_2SiO_5$.

8. The optical information recording/reproducing system as claimed in claim 7, wherein the fluorescent substance of the recording-bit producing layer is an infrared-to-visible conversion fluorescent substance capable of emitting visible fluorescence upon exposure to infrared excitation light.

9. The optical information recording/reproducing system as claimed in claim 8, wherein the fluorescent substance of the recording-bit producing layer is Er-activated $YF_3$, Tm-activated $YF_3$ or Er-activated $Y_2O_3$.

10. The optical information recording/reproducing system as claimed in claim 1, wherein the resistivity of the fluorescent substance of the recording-bit producing layer is $10^{16}$ Ω·cm.

11. The optical information recording/reproducing system as claimed in claim 10, wherein the resistivity of the fluorescent substance of the recording-bit producing layer is $10^{14}$ Ω·cm–$10^9$ Ω·cm.

12. The optical information recording/reproducing system as claimed in claim 1, wherein the thickness of the recording-bit producing layer is 250 Å–10,000 Å.

13. The optical information recording/reproducing system as claimed in claim 12, wherein the thickness of the recording-bit producing layer is 500 Å–1,000 Å.

14. The optical information recording/reproducing system as claimed in claim 1, wherein the light source the optical recording and reproducing beams is from the group consisting of Ar-ion laser, He-Ne laser, dye lasers, YAG laser and semiconductor lasers.

15. The optical information recording/reproducing system as claimed in claim 14, wherein the light source for the optical recording and reproducing beams is a semiconductor laser.

16. The optical information recording/reproducing system as claimed in claim 1, wherein the wavelengths of the optical recording and reproducing beams are each 350 nm–1,200 nm.

17. The optical information recording/reproducing system as claimed in claim 1, wherein the light source for the optical recording and reproducing beams is a semiconductor laser, the wavelength of which is 780 nm–850 nm.

18. The optical information recording/reproducing system as claimed in claim 1, comprising a plurality of recording media that have different fluorescence spectra, wherein each recording medium of said plurality has a surface that is laminated to a surface of an adjacent recording medium.

19. The optical information recording/reproducing system as claimed in claim 18, wherein recording of information is performed independently in each medium of the plurality of recording media, by synchronously driving the recording optical beam and the light source for the switching circuit according to recording drive signals by the use of each bias circuit and switching circuit which function independently for each medium, respectively, to effect the production of bits corresponding to the recording signals independently in each fluorescent substance layer, and reproduction of information is performed independently in each medium of the plurality of recording media, by radiating the reproducing optical beam on each fluorescent substance layer to generate reproducing signals, which are detected independently by the use of each optical reproducing system which can discriminate a wavelength from each other.

20. An optical information recording/reproducing system as claimed in claim 1, wherein means (B) comprises (i) a bias circuit and (ii) an optical switching circuit activated by a light source; and wherein recording of information is performed, by synchronously driving the recording optical beam and the light source for the switching circuit according to recording drive signals by the use of the bias circuit and the switching circuit, to effect the production of bits corresponding to the recording signals in the fluorescent substance layer, and reproduction of information is performed by radiating the reproducing optical beam on the fluorescent substance layer to generate reproducing signals, which are detected by the use of the optical reproducing system.

21. The optical information recording/reproducing system as claimed in claim 1, wherein said bias-voltage in the system is direct-current bias-voltage.

22. An optical information recording/reproducing system comprising
(A) a recording medium comprised of (i) a recording-bit producing layer that comprises a fluorescent substance selected from the group consisting of Er-activated $YF_3$, Tm-activated $YF_3$ and Er-activated $Y_2O_3$, (ii) a photoconductive layer and (iii) conductive layers between which layers (i) and (ii) are interposed, respectively, at least one of the conductive layers being transparent;
(B) means for selectively applying a voltage to both sides of the recording medium;
(C) means for radiating an optical recording beam to a site on the recording medium while applying a voltage to the recording medium and, then, applying a high electric field to the recording-bit producing layer by way of the photoconductive layer, the resistance of the recording-bit producing layer being lowered at the site, such that a dielectric breakdown is developed and the fluorescent substance loses fluorescence, whereby information is recorded in said recording-bit producing layer; and
(D) means for radiating an optical reproducing beam on the recording medium without applying any voltage to the recording medium and, then, reproducing information when fluorescence is produced by the fluorescent material, wherein said dielectric breakdown is effected by the photoswitching of a bias-voltage in the system.

* * * * *